United States Patent

Häberle et al.

[11] Patent Number: 6,040,411
[45] Date of Patent: Mar. 21, 2000

[54] LOW GLASS TEMPERATURE ORGANOSILOXANES

[75] Inventors: Norman Häberle, München; Franz-Heinrich Kreuzer, Martinsried; Jürgen Küpfer, München, all of Germany

[73] Assignee: Consortium fur elektrochemische Industrie GmbH, Munich, Germany

[21] Appl. No.: 09/090,025

[22] Filed: Jun. 10, 1998

[30] Foreign Application Priority Data

Jun. 19, 1997 [DE] Germany .............. 197 26 047

[51] Int. Cl.[7] ..................... C08G 77/06
[52] U.S. Cl. ............. 528/26; 528/15; 528/31; 528/33; 556/466; 556/479
[58] Field of Search .............. 528/15, 31, 33, 528/26; 556/466, 479

[56] References Cited

U.S. PATENT DOCUMENTS

| | | | |
|---|---|---|---|
| 5,211,877 | 5/1993 | Andrejewski et al. | 252/299.01 |
| 5,362,315 | 11/1994 | Müller-Rees et al. | 106/493 |
| 5,605,649 | 2/1997 | Stohrer et al. | 252/299.01 |
| 5,641,850 | 6/1997 | Stohrer et al. | 528/15 |
| 5,695,680 | 12/1997 | Weitzel et al. | 252/299.01 |

FOREIGN PATENT DOCUMENTS

| | | |
|---|---|---|
| 0358208 | 3/1990 | European Pat. Off. . |
| 0711780 | 5/1996 | European Pat. Off. . |
| 0724005 | 7/1996 | European Pat. Off. . |
| 4240743 | 6/1994 | Germany . |

OTHER PUBLICATIONS

Derwent Abstract (English) corresponding to EP 0 724 005 A.

*Primary Examiner*—Robert Dawson
*Assistant Examiner*—Jeffrey B. Robertson
*Attorney, Agent, or Firm*—Brooks & Kushman P.C.

[57] ABSTRACT

Organosiloxanes having low transition temperatures comprise at least one group of the general formula 1

$$-(CH_2)_p-(O)_q-C_6H_4-Z-(COO)_s-[A-M]_r-E-(CH_2-CH_2-O)_a-VN \quad (1)$$

and, if desired, a group of the general formula 2

$$-(CH_2)_m-(O)_n-(A)_t-Q-X \quad (2)$$

where

VN is a group $-COO-CH=CH_2$, $-COO-C(CH_3)=CH_2$, $-(CH_2)_u-OCH=CH_2$, $-CH=CH_2$ or an oxiranyl group and X, Z, A, M, Q, E, m, n, p, q, r, s, t, u, v and a are as defined herein.

22 Claims, No Drawings

LOW GLASS TEMPERATURE ORGANOSILOXANES

TECHNICAL FIELD

The invention relates to crosslinkable, preferably liquid-crystalline organosiloxanes ("LC organosiloxanes") which, following their crosslinking, feature low glass (transition) temperatures and at the same time low contents of uncrosslinked extractables, to processes for their preparation and crosslinking, and to their use.

BACKGROUND OF THE INVENTION

The preparation and use of crosslinkable LC siloxanes is exemplified by U.S. Pat. No. 5,211,877. These compounds comprise primarily property-determining mesogens and selectable proportions of constituents of the molecule which firstly contribute to the mesogenic properties of the LC organosiloxanes but secondly are capable, by virtue of pendant polymerizable groups, of irreversibly fixing—by means of three-dimensional crosslinking—certain chemical and physical properties which are characteristic of the LC silicones thus prepared. Depending on the nature and amount of admixture of further, copolymerizable mesogens and other constituents it is thus possible on crosslinking to prepare, for example, pigments whose color is based on the cholesteric phase of a copolymerized, optically active mesogen and/or on the addition of added mesogens.

When the LC organosiloxanes specified in U.S. Pat. No. 5,211,877 are employed as LC pigments they give different colors at processing temperatures of 130°, which is for example a customary processing temperature for the OEM finishing of steel panels, and, alternatively, when processed at 80° C., a customary processing temperature for refinishes. This differing behavior is brought about by the glass temperature of the pigment in conjunction with its swelling in the course of the preparation of coating materials, and the unswelling process when these coating materials are dried; in other words, by the action of solvents on the pigment. The swelling process, and the leaching of uncrosslinked constituents from the pigment, which may take place during said process, alter the structure of the pigment. Heating the dried coating film to above the glass temperature of the pigment leads to a pronounced relaxation, i.e. the pitch of the helix of the cholesteric liquid crystal is shortened and hence the reflection wavelength of the pigment is shifted toward shorter wavelengths; there is a blue shift. If, then, the glass temperature of the pigment is above the relatively low processing temperature of the coating material, relaxation does not occur completely, and the result is a color which is different from that of coating films which have been prepared at temperatures above the glass temperature and which hence correspond in their color to the completely relaxed material.

SUMMARY OF THE INVENTION

It is an object of the invention, therefore, to provide crosslinkable LC organosiloxanes which, after crosslinking, feature glass temperatures of not more than 80° C. and low contents of uncrosslinked extractables.

DETAILED DESCRIPTION OF THE INVENTION

The invention provides organosiloxanes which comprise a group of the general formula 1:

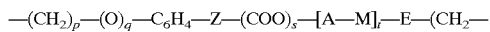

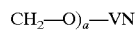

and, if desired, a group of the general formula 2

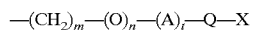

where

X is a cholesteryl, dihydrocholesteryl, doristeryl, isosorbidyl, isomannidyl or cholic acid radical or an unsubstituted or substituted radical selected from 1,4-phenyl, 4,4'-biphenylyl, 1,4-cyclohexylene, 4,4'-bicyclohexylene, 4,4'-cyclohexylenephenylene, 2,5-substituted 1,3-dioxanyl and pyrimidinyl radicals, where the substituent can be a $C_1$- to $C_5$-alkoxy radical, $C_1$- to $C_5$-alkyl radical, cyano radical, chloro radical or nitro radical, Q is a —COO— group or an —OOC— group or an —O— group, a chemical bond, or a —O—(C=O)—O— group, Z is a chemical bond or a group —$CH_2$— or —$CH_2$—$CH_2$—, A is a 1,4-phenylene, 1,5-naphthylene, 2,6-naphthylene, 2,7-naphthylene, 4,4'-biphenylene, 1,4-cyclohexylene, 4,4'-bicyclohexylene, 4,4'-cyclohexylenephenylene, 2,5-(1,3-dioxanylene) or pyrimidinylene radical, M is a chemical bond, an oxygen atom or a group —COO—, —OCO— or —OOC—$(CH_2)_v$—COO$CH_2CH_2$—, VN is a group —COO—CH=$CH_2$, —COO—C($CH_3$)=$CH_2$, —$(CH_2)_u$—O—CH=$CH_2$, —CH=$CH_2$ or an oxiranyl group, E is a group $(CH_2)_r$, where individual $CH_2$ groups can be replaced by oxygen, m and p are each integers from 3 to 6, r is 0 or an integer from 1 to 10, n, q and s are each 0 or 1, t is 0 or an integer from 1 to 3, u and v are each an integer from 2 to 8, and a is 0 or an integer from 1 to 6, with the proviso that in the groups of the general formulae 1 and 2 no oxygen atoms are attached directly to one another.

The organosiloxanes are preferably liquid-crystalline.

The number of silicon atoms in the organosiloxanes is preferably from 2 to 70, in particular from 3 to 40.

The organosiloxanes are preferably composed of units of the general formula 3

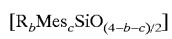

in which

R are $C_1$- to $C_4$-alkyl radicals,

Mes is a group of the general formula 1 or 2, b is 0, 1 or 2, and c is 0 or 1.

The average value of c is preferably at least 0.5, in particular at least 0.8.

Preferably, the organosiloxanes are linear open-chain, cyclic or silsesquioxanes.

Particular preference is given to open-chain liquid-crystalline organosiloxanes comprising from 2 to 60, in particular from 3 to 40 units of the general formula 3 and to cyclic liquid-crystalline organo-siloxanes comprising from 4 to 7 units of the general formula 3.

In the general formulae 1 and 2, X is preferably a cholesteryl radical, a doristeryl radical, a phenyl radical which is unsubstituted or substituted in position 4 and whose substituent can be a $C_1$- to $C_5$-alkoxy radical, $C_1$- to $C_5$-alkyl radical, a cyano radical or a nitro radical.

Preferably, Z is a chemical bond.

Preferably, M is a chemical bond, an oxygen atom or a group —COO.

Preferably, E is a group $(CH_2)_r$ where no $CH_2$ groups can be replaced by oxygen.

Preferably, r is 0 or an integer from 1 to 7.

Preferably, t is 1 or 2.

Preferably, a is 0 or an integer from 1 to 4.

The liquid-crystalline organosiloxanes comprise crosslinker units of the general formula 1 which owing to their structure lead to organosiloxane compositions having relatively low glass temperatures, in particular to LC pigments. These LC pigments undergo complete relaxation even at 80° C. and therefore feature identical reflection wavelengths following processing even at greatly differing processing temperatures of which the lower is at least 80° C.

The low glass temperatures of the pigments prepared from the LC silicones of the invention are brought about by a content of flexible structural units M, E and/or $(CH_2-CH_2-O)_a$ of the general formula 1. It is additionally possible to admix further compounds which comprise at least one, or else two or more, polymerizable groups with the organosiloxanes of the invention and to react them together with these to form an insoluble LC substance (pigment). Examples of compounds of this kind which can be admixed are crosslinkers of the general formula 4

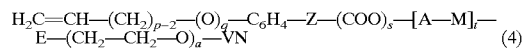
(4)

in which

Z, A, E, M, VN, p, q, s, t and a are as defined for the general formula 1, with the proviso that in the compounds of the general formula 4 no oxygen atoms are attached directly to one another.

Further examples of admixable crosslinkers are 4-methacryloyloxyphenyl 4-allyloxybenzoate, known from WO 94/09086, bisacrylates or bismethacrylates of mesogenic compounds of the general formula 5

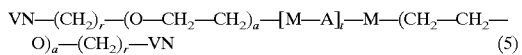
(5)

in which VN, a, r, A, t and M are as defined for the general formulae 1 and 2, which are used alone or in a mixture with compounds of the general formula 4 and/or nonmesogenic bisacrylates and/or bismethacrylates.

Preferably, in the general formula 5, t is from 3 to 6, a is 0, 1 or 2,

M is an oxygen atom, a carboxyl group or an oxycarbonyl group

A is a 1,4-phenylene radical

VN is a methacryloyl radical.

Examples of mesogenic compounds of the formula 5 are 4,4'-biphenyl bis(6-methacryloyloxyhexanoate) or 1,4-bis[(4-methacryloyloxybutoxy)phenylcarboxy]benzene, whose preparation is described in the Examples section, or compounds of the formulae I, II, III and/or IV

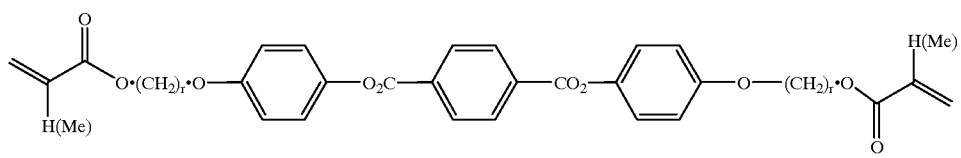
(I)

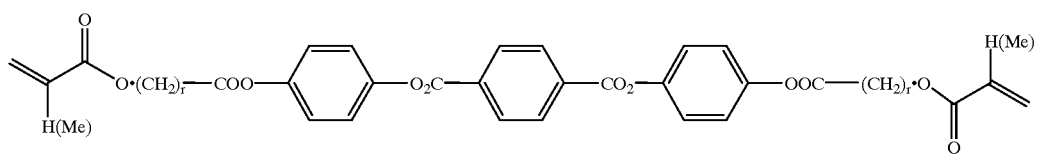
(II)

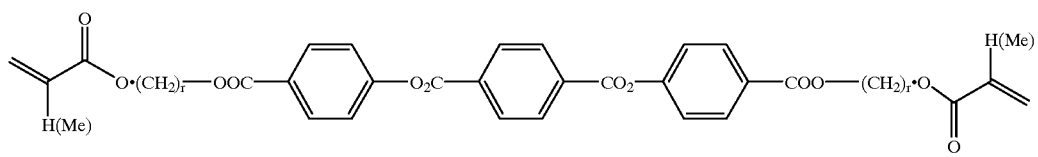
(III)

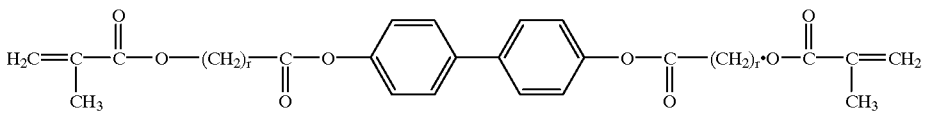
(IV)

in which each r is preferably an integer from 3 to 6. Examples of nonmesogenic compounds which can be used as additional components are bisacrylates or bismethacrylates of straight-chain or branched aliphatic or cycloaliphatic diols or triols or of polyethers, trismethacrylates or bisvinyl ethers of aliphatic diols, individually or as mixtures of such compounds.

Furthermore, the LC organosiloxanes of the invention can also be blended with substances which contain no polymerizable groups and which function as external plasticizers in the substance which forms after the polymerization.

Examples of this type of compound are phthalic diesters, sebacic diesters or other compounds normally used for this purpose.

Prior to crosslinking it is possible to mix the liquid-crystalline organosiloxanes with further property-imparting, copolymerizable compounds, examples being further chiral, hydrosilylatable or nonhydrosilylatable compounds, in order to establish desired properties such as, for example, desired reflection wavelengths. It is likewise possible to admix color-imparting compounds.

The liquid-crystalline organosiloxanes of the invention can be prepared by reacting organosiloxanes composed of units of the general formula 6

$$[R_bH_cSiO_{(4-b-c)/2}] \quad (6)$$

in which R, b and c are as defined for the general formula 3
with a mixture of compounds of the above general formula 4 and, if desired, 7

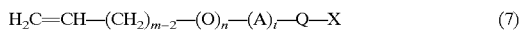

$$H_2C=CH-(CH_2)_{m-2}-(O)_n-(A)_t-Q-X \quad (7)$$

in which
X, A, Q, m, n and t are as defined for the general formula 2, with the proviso that in the compounds of the general formula 7 no oxygen atoms are attached directly to one another.

The compounds of the general formula 4 are notable in that they have, at one end of the preferably rod-shaped molecule, a terminal, hydrosilylatable olefinic multiple bond, preferably a double bond, while at the other end of the molecule they have a polymerizable group which is different in its reactivity from the olefinic group and which, although crosslinkable, does not hinder the hydrosilylation of the olefinic multiple bond.

The above reaction takes place preferably in the presence of at least one metal from the platinum group and/or its compounds as catalyst. The sum of the numbers of moles of the compounds of the general formulae 4 and 7 corresponds preferably, depending on the respective reactivity, to from 0.75 to 1.25 times the sum of all Si—H bonds in the organosiloxanes of the general formula 6.

Examples of suitable catalysts are platinum, palladium, rhodium, iridium and compounds thereof, preferably platinum and/or its compounds. It is possible here to employ all catalysts which have also been employed hitherto for the addition of hydrogen atoms bonded directly to Si atoms onto aliphatically unsaturated compounds. Examples of such catalysts are metallic and finely divided platinum, which may also be on supports such as silica, alumina or activated carbon, compounds or complexes of platinum, such as platinum halides, e.g. $PtCl_4$, $H_2PtCl_6 \cdot 6 H_2O$, $Na_2PtCl_4 \cdot 4 H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6 H_2O$ and cyclohexanone, platinum-vinylsiloxane complexes, especially platinum-divinyltetramethyl-disiloxane complexes with or without a content of detectable, inorganically bonded halogen, bis(gamma-picoline)-platinum dichloride, trimethylenedipyridine-platinum dichloride, dicyclopentadieneplatinum dichloride, dimethyl sulfoxide-ethylene-platinum(II) dichloride, and reaction products of platinum tetrachloride with olefin and primary amine or secondary amine or primary and secondary amine, such as the reaction product of platinum tetrachloride, dissolved in 1-octene, with sec-butylamine, or ammonium-platinum complexes.

Catalyst is preferably employed in amounts of from 0.05 to 0.50 mmol, calculated in each case as elemental platinum and based on the number of moles of the Si—H groups which are composed of units of the general formula 6.

The reaction is preferably carried out at temperatures from 0 to 150° C., preferably at pressures from 0.05 MPa to 2.0 MPa.

Should the organosiloxanes which are composed of units of the general formula 6, or the compound(s) of the formula 4 and/or 7, be very slow to react, it is also possible to operate at higher temperatures, higher pressures and in the presence of more platinum catalyst.

The reaction is preferably carried out in a solvent, which should in particular be aprotic; solvents or solvent mixtures having a boiling range of up to 160° C., in particular of up to 120° C. and in each case 0.1 MPa (abs.) are preferred. Examples of solvents are esters, such as methyl acetate, ethyl acetate, n- and iso-propyl acetate, n-, sec- and t-butyl acetate, ethyl formate and diethyl carbonate; ethers, such as dioxane, diethyl ether, di-n-propyl ether, diisopropyl ether, di-n-butyl ether, tetrahydrofuran, ethylene glycol monomethyl ether, ethylene glycol monoethyl ether, diethylene glycol dimethyl ether and anisole, chlorinated hydrocarbons, such as dichloromethane, trichloromethane, tetrachloromethane, 1,2-dichloroethane, trichloroethylene, tetrachloroethylene and chlorobenzene; hydrocarbons, such as pentane, n-hexane, hexane isomer mixtures, cyclohexane, heptane, octane, dry-cleaning gasoline, petroleum ether, benzene, toluene, xylenes; ketones, such as acetone, methyl ethyl ketone or methyl isobutyl ketone; or mixtures of these solvents.

The term solvent does not mean that all of the reaction components have to dissolve therein. The reaction can also be conducted in a suspension or emulsion of one or more reaction partners. The reaction can alternatively be performed in a solvent mixture having a miscibility gap, with at least one reaction partner being soluble in each of the mixed phases.

The preparation of compounds of the general formula 7 is known, for example, from U.S. Pat. No. 5,221,759.

The liquid-crystalline organosiloxanes can—without being restricted to this application—be employed as base materials for the preparation of pigments. To this end the liquid-crystalline organosiloxanes are oriented, crosslinked and then processed to pigments. The liquid-crystalline organo-siloxanes can also be employed to prepare films, alone or as a blend with abovementioned compounds. These films may be used, for example, in liquid-crystal displays.

In the examples which follow, unless indicated otherwise,
a) all amounts are by weight;
b) all pressures are 0.10 MPa (abs.);
c) all temperatures are 20° C.;
d) the following abbreviations are used:
C=crystalline,
I=isotropic,
N=nematic,
S=smectic,
m.p.=melting point,
BHT=2,6-di-tert-butyl-4-methylphenol.

EXAMPLES

Example 1

4-(4-Methacryloyloxybutoxy)phenyl 4-allyloxybenzoate 162.1 g (0.6 mol) of 4-hydroxyphenyl 4-allyloxybenzoate, known from U.S. Pat. No. 5,211,877, were dissolved in 3 l of methyl ethyl ketone, and 1.32 kg (6 mol) of commercial 1,4-dibromobutane, and 414 g (3 mol) of potassium carbonate were added. The mixture was heated to 80° C. with stirring and held at this temperature for 4 h. It was subsequently cooled, the remaining potassium carbonate was filtered off and the filtrate was concentrated. After the excess dibromobutane had been stripped off, the crude product was recrystallized twice from isopropanol. 4-(4-Bromobutoxy)phenyl 4-allyloxybenzoate was obtained in a yield of 90%. The ester shows the following phase behavior: C 64, N 81–85, isotropic.

118.4 g (0.29 mol) of this ester were dissolved in 50 ml of dimethylformamide at 70° C., 0.3 g of 2-tert-butyl-4,6-dimethylphenol was added as stabilizer, 111.7 g (0.9 mol) of dry potassium methacrylate salt were added, and the mixture was diluted with 70 ml of toluene. The reaction mixture was stirred at 100° C. for 6 h, then cooled and diluted with 800 ml of methyl tert-butyl ether. The precipitate was filtered off with suction, and the washing solution and the filtrate were combined and washed three times with water. They were then concentrated, and the crude product obtained was recrystallized from isopropanol. 4-(4-Methacryloyloxybutoxy)phenyl 4-allyloxybenzoate of m.p. 62–63° C. was obtained in a yield of 83%. Between 41 and 45° C. the ester has a nematic phase which occurs only on supercooling.

The Following Compounds Were Prepared Analogously 4-(4-Methacryloyloxyethoxy)phenyl 4-allyloxybenzoate m.p. 75–77° C.

4-(4-Methacryloyloxypropoxy)phenyl 4-allyloxybenzoate m.p. 67–68° C.

4-(4-Methacryloyloxypentyloxy)phenyl 4-allyloxybenzoate m.p. 50–52° C. (nematic on supercooling between 47 and 44°)

4-(4-Methacryloyloxyhexyloxy)phenyl 4-allyloxybenzoate m.p. 51° C. (nematic on supercooling between 51 and 48°)

4-(4-Methacryloyloxydecyloxy)phenyl 4-allyloxybenzoate m.p. 46° C.

A 1:1:1 mixture of the butoxy, pentyloxy and hexyloxy derivatives has a mixed melting point at 28° C.; this mixture (nematic) clears at 43° C.

Example 2

4-Methacryloyloxyphenyl 3-(4-allyloxyphenyl) propionate 38.8 g (0.2 mol) of ethyl phloretate (prepared from commercial phloretic acid (e.g. Merck, D-64271 Darmstadt, DE) by esterification with ethanol) were dissolved in 20 ml of acetone, and 36.3 g (0.3 mol) of allyl bromide, 48.3 g (0.35 mol) of potassium carbonate and 0.05 g of sodium iodide were added. The mixture was heated at reflux for 7 h and cooled, and the excess of carbonate was filtered off. Concentration of the filtrate gave ethyl 3-(4-allyloxyphenyl) propionate, which was hydrolyzed in customary manner with methanolic potassium hydroxide to give the free acid. Customary reaction of the acid with thionyl chloride in toluene at 80° C. gave the 3-(4-allyloxyphenyl)propionyl chloride (b.p. 0.01 hPa: 106–108° C.) in 93% yield. 51.2 g (0.22 mol) of this acid chloride and 39.2 g (0.22 mol) of hydroquinone monomethacrylate were dissolved in 300 ml of toluene at 65° C. 24.0 g (0.24 mol) of triethylamine were added dropwise with stirring, and the mixture was subsequently stirred for 3 h. After cooling, the amine hydrochloride was filtered off and the filtrate was worked up in a customary manner. Concentration of the organic residue and recrystallization of the solid residue from toluene/benzine (b.p. 100–140) gave 4-methacryloyloxyphenyl) 3-(4-allyloxyphenyl)propionate in 80% yield. The ester melts at 67° C.

Example 3

7-Methacryloyloxy-2-naphthyl 4-allyloxybenzoate

In the same way as described in Example 2, 29.5 g (0.15 mol) of 4-allyloxybenzoyl chloride and 34.5 g (0.15 mol) of 2,7-naphthalenediol monomethacrylate (obtainable in a manner similar to that of the hydroquinone monomethacrylate referred to in Example 2 of U.S. Pat. No. 4,604,342) were reacted with triethylamine as acid scavenger. 7-Methacryloyloxy-2-naphthyl 4-allyloxybenzoate, $C_{22}H_{20}O_5$, with an m.p. of 85° C. was obtained in 95% yield. The 1,4-, 1,5- and 2,6-disubstituted naphthalene derivatives can be prepared in the same way.

Example 4

4-Methacryloyloxyphenyl 4-allyloxycinnamate 33.4 g (0.15 mol) of the acid chloride were dissolved in toluene, and 27.5 g (0.15 mol) of hydroquinone monomethacrylate and 15.2 g (0.15 mol) of triethylamine were added. The mixture was heated to 100° C. with stirring and was held at this temperature for 10 minutes. It was then cooled, the amine hydrochloride was washed out, and the residual solution was worked up in a customary manner. 4-Methacryloyloxyphenyl 4-allyloxycinnamate (m.p. 118° C.) was obtained in 60% yield.

Example 5

Mixture of 4-allyloxybenzoic acid 4-(4-methacryloylethoxy(ethoxy)$_n$) phenyl esters with n= 1–6

55.3 g (about 0.14 mol) of $H_2C=CH-CH_2-O-C_6H_4-COO-C_6H_4-O-(CH_2CH_2O)_nH$ (mixture of n=2, 3 and 4, here with an average value of n=3.4; obtained in a known procedure by ethoxylating 4-hydroxyphenyl 4-allyloxyphenylbenzoate in the manner disclosed in EP 358 208 by addition reaction with ethylene oxide under KOH catalysis, were dissolved in 50 ml of toluene, 3 g of 4-toluene sulfonic acid and 46.3 g (0.3 mol) of methacrylic anhydride, and also 0.2 g of BHT (polymerization inhibitor), were added. The mixture was heated to 100° C. with stirring, and stirring was continued for 1 h. After cooling, the mixture was diluted with 200 ml of toluene, the excess acid was removed by washing with 0.4-molar NaOH, and the organic phase was washed to neutrality with water. The organic phase was concentrated. The volatile constituents were removed by heating in vacuo at 0.1 hPa and 55° C. The crude product which remained was purified by recrystallization from 700 ml of toluene and was broken down by fractional crystallization into an ester mixture of the following general formula $$H_2C=CH-CH_2-O-C_6H_4-COO-C_6H_4-O-(CH_2CH_2O)_a-OOC-C(CH_3)=CH_2$$

with a equal to 2.2 (25 g) and a melting point of 57° C., and a liquid component of the same formula but with a equal to 5.2 (35 g).

Example 6

4-(3-Methacryloyloxypropylcarboxy)phenyl 4-allyloxybenzoate ($CH_2=CH-CH_2O-C_6H_4COOC_6H_4OCO(CH_2)_3-OCO-C(CH_3)=CH_2$)

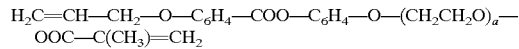

119 g (0.44 mol) of 4-hydroxyphenyl 4-allyloxybenzoate and 81.6 g (0.44 mol) of commercial 4-bromobutyryl chloride (Fluka, D-89231 Neu-Ulm, DE) were dissolved in 250 ml of toluene, and the mixture was heated to 70° C. 50 g of triethylamine, dissolved in 50 ml of toluene, were added dropwise with stirring over 1 h. After a further 2 h of stirring at 70°, the mixture was cooled, and the amine hydrochloride formed was filtered off. After washing the filtrate with NaOH solution (3% strength), water, hydrochloric acid (2% strength) and again with water, it was concentrated and the crude product obtained was recrystallized from isopropanol. 4-(4-Bromobutyryloxy)phenyl 4-allyloxybenzoate, $C_{20}H_{19}BrO_5$ (419.3) was obtained in 75% yield.

176 g (0.42 mol) of this compound and 86.9 g (0.7 mol) of potassium methacrylate were dissolved in 150 ml of N-methylpyrrolidone, and the mixture was heated to 95° C. and stirred at this temperature for 5 h. It was then cooled, 600 ml of methyl tert-butyl ether and 150 ml of water were added, and the two phases which formed were separated. The organic phase was washed three times with water, and concentrated, and the product was crystallized. The threefold recrystallization from isopropanol gave the target product in 63% yield: $C_{24}H_{28}O_7$ (428.5). The melting point is 66° C.

An entirely analogous method was used to prepare 4-(5-methacryloyloxypentylcarboxy)phenyl 4-allyloxybenzoate with the aid of 6-bromohexanoic acid, the product having a melting point of 52° C.

Exactly the same procedure was used to prepare 4-(10-methacryloyloxydecylcarboxy)phenyl 4-allyloxybenzoate (phase properties C 55 N, I 60, I).

Example 7

4-(4-Methacryloyloxybutyl) 4-(4-allyloxybenzoyloxy)-benzoate (CH$_2$=CH—CH$_2$O—C$_6$H$_4$—COO—C$_6$H$_4$—COO—(CH$_2$)$_4$—OCO—C(CH$_3$)=CH$_2$)

4-Acetoxybenzoyl chloride and 4-hydroxybenzaldehyde were used to prepare (4-formyl)phenyl 4-acetoxybenzoate, m.p. 98–100° C., in 45% yield. 18 g (0.063 mol) of this aldehyde were dissolved in 180 ml of glacial acetic acid, 9.5 g of potassium manganate and 180 ml of methyl ethyl ketone were added, and the mixture was heated to 50° C. with stirring. After 8 hours of stirring it was acidified with hydrochloric acid, 250 ml of ethyl acetate were added, and the phases were worked up. The concentrated ethyl acetate solution gave 16.8 g (89%) of 4-(4-acetoxybenzoyloxy) benzoic acid, $C_6H_{12}O_6$ (300.3). The acid chloride was obtained in 95% yield from this acid by customary reaction with thionyl chloride.

16.5 g (0.052 mol) of this acid chloride and 8 g (0.052 mol) of 1,4-butanediol monomethacrylate (Poly-sciences Inc., D-69208 Eppelheim, DE) were dissolved in 50 ml of toluene, 0.02 g of BHT was added, 6 g of triethylamine were added, and the mixture was stirred at 80–100° C. for 1 h. After working up by phase separation, washing and drying, 100 ml of methanol were added to the purified residue and the mixture was cooled to 15° C. The precipitated crystals of 4-(4-methacryloyloxybutoxy)phenyl 4-acetoxybenzoate—16 g (70%, purity about 90%)—were filtered off and dried.

8.8 g (0.02 mol) of this ester, 0.01 g of BHT and 4.6 g of a solution of 9 g of ammonia and 50 g of methanol were dissolved in 20 ml of THF+20 ml of methanol, and the mixture was stirred at 50° C. for 2.5 h. To remove a small proportion of polymer, the mixture was dissolved in Driveron/petroleum ether (4:1), stirred thoroughly with Tonsil® L 80 (Südchemie AG, Munich, Delaware), and the mixture was filtered and concentrated to give 8.8 g of product (90%). After one week of standing the compound crystallized, and had a melting point of about 20° C.

Example 8

4-(Methacryloyloxyethyloxycarbonyl-ethyloxycarbonyl)phenyl 4-allyloxybenzoate

First, Na 4-hydroxyphenyl 4-allyloxy-benzoate was prepared from 258.3 g (0.6 mol) of hydroquinone bis(4-allyloxybenzoate) with 36 g (0.66 mol) of sodium methylate at 30–40° C. in 900 ml of tetrahydrofuran, and 70.5 g (0.7 mol) of succinic anhydride were added to the reaction mixture. Stirrability of the mixture was maintained by adding 450 ml of tetrahydrofuran. After stirring at 20° C. for two hours, the mixture was acidified with 3N hydrochloric acid and the phases were separated. The organic phase was washed twice with water and then dried azeotropically for 4.5 h using n-pentane as entrainer. Customary crystallization technique gave two portions of a crude product, which were combined and recrystallized together from isopropanol. This gave 142 g (64%) of mono-4-(4-allyloxybenzoyloxy)phenyl succinate with a melting point of 141–142° C.

Customary reaction of 37 g (0.1 mol) of this acid in 150 ml of toluene with 12.8 g (0.11 mol) of thionyl chloride at 60–80° C. gave the crystalline acid chloride in 96% yield.

10.1 g (0.1 mol) of triethylamine, 12.7 g (0.09 mol) of 2-hydroxyethyl methacrylate and 0.03 g of BHT were dissolved in 200 ml of toluene, and 35.4 g (0.09 mol) of the above-described acid chloride were added with stirring in portions such that the temperature of the mixture did not exceed 45° C. After 1 h of stirring at 40° C. the mixture was cooled, the precipitated amine hydrochloride was separated off and the toluene was removed by evaporation. The residue was taken up in 400 ml of ether/petroleum ether (3:1), washed with 2 N NaOH and then with water, the phases were separated and the organic phase was dried over sodium sulfate. Concentration and cooling gave the target product in 57% yield. It melts at 58–59° C.

Example 9

Liquid-Crystalline Silicone With a Low Glass Temperature 170 ml of toluene were added to 71 g (0.13 mol) of cholesteryl 4-allyloxybenzoate. The suspension was brought to the boil with stirring, and toluene was distilled off azeotropically. After the mixture had cooled to about 60° C., 21 g (0.35 mol) of 1,3,5,7-tetramethylcyclotetrasiloxane and 0.53 g of a 0.5% strength by weight solution of cyclooctadienyldichloroplatinum catalyst (Wacker—Chemie GmbH, D-81737 Munich, Delaware) in methylene chloride were added. The reaction solution was heated to 85° C. and stirred for 1 hour. After it had cooled to 40° C., 80 g (0.194 mol) of 4-(4-methacryloyloxybutoxy)phenyl 4-allyloxybenzoate (from Example 1), 0.09 g (0.4 mmol) of BHT and 1.06 g of a 0.5% strength by weight solution of cyclooctadienyldichloroplatinum catalyst in methylene chloride were added. The solution was then heated to about 75° C. and stirred for 1.5 hours. After it had cooled to 20° C., 37.2 g (89 mmol) of 4-(4-methacryloyloxybutoxy)phenyl 4-allyloxybenzoate, 9.85 g (22 mmol) of cholesteryl methacrylate and 0.09 g of BHT were added. The solution was subsequently filtered over a short Celite® (Manville Corp., Denver, U.S.A.) column, and 5.36 g of the photoinitiator Irgacure® 907 (Ciba-Geigy) were added.

The solution was freed from the solvent (residual content <1% by weight of toluene) by means of a thin-film evaporator at a pressure of 25 hPa and with a heating jacket temperature of 90° C.

The liquid-crystal mixture thus obtained has a glass transition at about −1° C. The clearing temperature (peak) from cholesteric to isotropic is at 112° C. The viscosity at 90° C. is about 620 mPas.

Thin films of the material, oriented at 90° C. and UV-crosslinked, have, after cooling to 20° C., a reflection wavelength of 467 nm. The crosslinked material has a glass transition temperature of 72° C. The fraction extractable from the crosslinked material by treatment with chloroform is 8% by weight.

Example 10

Liquid-Crystalline Silicone With a Low Glass Temperature 170 ml of toluene were added to 71 g (0.13 mol) of cholesteryl 4-allyloxybenzoate. The suspension was brought to the boil with stirring, and toluene was distilled off azeotropically. After the mixture had cooled to about 60° C., 21 g (0.35 mol) of 1,3,5,7-tetramethylcyclotetrasiloxane and 0.53 g of a 0.5% strength by weight solution of cyclooctadienyldichloroplatinum catalyst (Wacker—Chemie, D-81737 Munich, Delaware) in methylene chloride were added. The reaction solution was heated to 85° C. and stirred for 1 hour. After it had cooled to about 40° C., 85 g (0.194 mol) of 4-(4-methacryloyloxyhexyloxy)phenyl 4-allyloxybenzoate (from Example 1), 0.09 g (0.4 mmol) of BHT and 1.06 g of a 0.5% strength by weight solution of cyclooctadienyldichloroplatinum catalyst in methylene chloride were added. The solution was then heated to about 75° C. and stirred for 1.5 hours. After it had cooled to 20° C., 37.6 g (85 mmol) of 4-(4-methacryloyloxyhexyloxy)phenyl 4-allyloxybenzoate, 12 g (26 mmol) of cholesteryl methacrylate and 0.09 g of BHT were added. The solution was subsequently filtered over a short Celite® column, and 5.36 g of the photoinitiator Irgacure® 907 were added.

The solution was freed from the solvent (residual content <1% by weight of toluene) by means of a thin-film evaporator at a pressure of 25 mbar and with a heating jacket temperature of 90° C.

The liquid-crystal mixture thus obtained has a glass transition at about −9° C. The clearing temperature (peak) from cholesteric to isotropic is at 104° C. The viscosity at 90° C. is about 710 mPas.

Thin films of the material, oriented at 90° C. and UV-crosslinked, have, after cooling to room temperature, a reflection wavelength of 465 nm. The crosslinked material has a glass transition temperature of 71° C. The fraction extractable from the crosslinked material by treatment with chloroform is 7% by weight.

Example 11

Liquid-Crystalline Silicone With a Low Glass Temperature (Mixture of Two Different Crosslinker Units)

170 ml of toluene were added to 71 g (130 mmol) of cholesteryl 4-allyloxybenzoate. The suspension was brought to the boil with stirring, and toluene was distilled off azeotropically. After the mixture had cooled to about 60° C., 21 g (0.35 mol) of 1,3,5,7-tetramethylcyclotetrasiloxane and 0.53 g of a 0.5% strength by weight solution of the cyclooctadienyldichloroplatinum catalyst (Wacker-Chemie, 81737 Munich, Delaware) in methylene chloride were added. The reaction solution was heated to 85° C. and stirred for 1 hour. After it had cooled to about 40° C., 40 g (97 mmol) of 4-(4-methacryloyloxybutoxy)phenyl 4-allyloxybenzoate (from Example 1), 42 g (97 mmol) of 4-(4-methacryloyloxyhexyloxy)phenyl 4-allyloxybenzoate (from Example 1), 0.09 g (0.4 mmol) of BHT and 1.06 g of a 0.5% strength by weight solution of cyclooctadienyldichloroplatinum catalyst in methylene chloride were added. The solution was then heated to about 75° C. and stirred for 1.5 hours. After it had cooled to 20° C., 22 g (97 mmol) of 4-(4-methacryloyloxybutoxy)phenyl 4-allyloxybenzoate, 22 g (0.05 mol) of 4-(4-methacryloyloxyhexyloxy)phenyl 4-allyloxybenzoate, and 0.09 g of BHT were added. The solution was subsequently filtered over a short Celite® column, and 5.36 g of the photoinitiator Irgacure® 907 were added.

The solution was freed from the solvent (residual content <1% by weight of toluene) by means of a thin-film evaporator at a pressure of 25 mbar and with a heating jacket temperature of 90° C.

The liquid-crystal mixture thus obtained has a glass transition at about −13° C. The clearing temperature (peak) from cholesteric to isotropic is at 114° C. The viscosity at 90° C. is about 700 mPas.

Thin films of the material, oriented at 90° C. and UV-crosslinked, have, after cooling to room temperature, a reflection wavelength of 540 nm.

The crosslinked material has a glass transition temperature of 72° C. The fraction extractable from the crosslinked material by treatment with chloroform is 8% by weight.

Example 12 (Comparative Example)

Known Liquid-Crystalline Silicone 170 ml of toluene were added to 71 g (0.13 mol) of cholesteryl 4-allyloxybenzoate. The suspension was brought to the boil with stirring, and toluene was distilled off azeotropically. After the mixture had cooled to about 60° C., 21 g (0.351 mol) of 1,3,5,7-tetramethylcyclotetrasiloxane and 0.5 g of a 0.5% strength by weight solution of cyclooctadienyldichloroplatinum catalyst in methylene chloride were added. The reaction solution was heated to 85° C. and stirred for 1 hour. After it had cooled to about 40° C., 65.5 g (0.194 mol) of 4-methacryloyloxyphenyl 4-allyloxybenzoate, 0.08 g (0.035 mol) of BHT and 1.06 g of a 0.5% strength by weight solution of cyclooctadienyldichloroplatinum catalyst in methylene chloride were added. The solution was then heated to about 75° C. and stirred for 1.5 hours. After it had cooled to 20° C., 32.4 g (96 mmol) of 4-methacryloyloxyphenyl 4-allyloxybenzoate, 11.8 g (26 mmol) of cholesteryl methacrylate and 0.078 g (0.035 mol) of BHT were added. The solution was subsequently filtered over a short Celite® column, and 4.92 g of the photoinitiator Irgacure® 907 were added.

The solution was freed from the solvent (residual content <1% by weight of toluene) by means of a thin-film evaporator at a pressure of 25 hPa and with a heating jacket temperature of 90° C.

The liquid-crystal mixture thus obtained has a glass transition at about 9° C. The clearing temperature (peak) from cholesteric to isotropic is at 136° C. The viscosity at 90° C. is about 1000 mPas. Thin films of the material, oriented at 90° C. and UV-crosslinked, have, after cooling to room temperature, a reflection wavelength of 572 nm. The crosslinked material has a glass transition temperature of 88° C. The fraction extractable from the crosslinked material by treatment with chloroform is 14% by weight.

Example 13

Blueshift-Free LC Pigments

The siloxane-based pigments with a liquid-crystalline structure were prepared from the mixtures obtained in accordance with Examples 9, 10 and 12. Using a procedure similar to that described in U.S. Pat. No. 5,362,315 (corresponding to EP 0 686 674) they were photochemically crosslinked, and the crosslinked material was detached from the carrier film and ground. 1 g of each of the resulting pigments was incorporated into 9 g of a conventional acrylate-melamine resin binder system, after the viscosity had been adjusted with a diluent to a flow time of 80 seconds from a DIN 532M-4 mm flow cup. The mixture was left to stand overnight and then applied with a film-drawing applicator (from Erichsen, D-58675 Hemer, Delaware) to glossy black card, employing a gap height of 300 µm and a drawing rate of 10 mm/s. Following an evaporation period of 10 minutes at RT, the samples were thermally conditioned for 1 h at 80° C. and 130° C. respectively. The reflection spectra were measured with a reflection goniometer (H.-J. Eberle, A. Miller, F.-H. Kreuzer, LIQ. CRYST. 5, 907–916 (1989)) with an angle geometry of 45°/25°. The comparison material used was a material from Example 12 (spacer length: 0).

The glass temperatures were determined with a DSC instrument model TA 4000 from Mettler-Toledo (D-61449 Steinbach, Delaware). For Tg, Table I gives the inflection points.

TABLE I

| Example | Spacer length E; value of r | $T_g$ | Middle wavelength after thermal conditioning at 80° C. | Middle wavelength after thermal conditioning at 130° C. | Decrease in the middle wavelength |
| --- | --- | --- | --- | --- | --- |
| A[1] | 4 | 72 | 461 | 459 | 2 |
| B[2] | 6 | 71 | 460 | 460 | 0 |
| C[3] | 0 | 88 | 580 | 561 | 19 |

[1]Pigment base composition comprising crosslinker components from Ex. 9
[2]Pigment base composition comprising crosslinker components from Ex. 10
[3]Comparative example comprising crosslinker components from Ex. 12

Through the use of the crosslinker units of the invention (Example 9 and 10 in comparison to Example 12) it is possible to prepare crosslinked materials having a lower glass transition temperature and, at the same time, having lower contents of extractables, as is shown in Example 13.

Example 14

1,4-Bis[(4-methacryloyloxybutoxy)phenylcarboxy]benzene 35.0 g (0.1 mol) of hydroquinone bis(4-hydroxybenzoate) were stirred with 58.5 g (0.3 mol) of 4-bromobutyl acetate and 55.2 g (0.4 mol) of potassium carbonate in 150 ml of dimethylformamide at 100° C. for 2 h. The product was then precipitated by adding H$_2$O and was taken up in 150 ml of toluene at 80° C. The organic phase was washed with H$_2$O, and hydroquinone bis-4-(4-acetoxybutyloxy)benzoate was crystallized out by cooling. Yield: 52.1 g (90%).

50.0 g (85 mmol) of hydroquinone bis-4-(4-acetoxybutyloxy)benzoate in 150 ml of toluene and 100 ml of ethanol were transesterified with 15.0 g (7.5%) of p-toluenesulfonic acid by distillative removal of ethyl acetate/ethanol to give the hydroquinone bis-4-(4-hydroxybutyloxy)benzoate. During the reaction, the loss of ethanol through distillation was compensated by adding 50 ml of ethanol and 50 ml of toluene. The product which precipitates on cooling was washed with toluene and dried. Yield 35.7 g (85%). The product has a melting point of 180° C.

35.0 g (70 mmol) of hydroquinone bis-4-(4-hydroxybutyloxy)benzoate were esterified with 55.0 g (0.35 mol) of methacrylic anhydride and 3.5 g (5.0%) of p-toluenesulfonic acid over the course of 2 h at 100° C., with addition of 50 mg of 3,5-di-tert-butyl-4-hydroxytoluene. The product was precipitated with ethanol, the precipitate was taken up in ethyl acetate and the mixture was washed with sodium hydrogen carbonate and H$_2$O. It was then dried over Na$_2$SO$_4$, the solvent was distilled off in vacuo and the 1,4-bis[(4-methacryloyloxybutoxy)phenylcarboxy]benzene was re-crystallized from ethyl acetate. Yield: 42.0 g (95%). The product shows the following phase behavior: C 81 N 142–145, isotropic.

Example 15

4,4'-Biphenyl bis(6-methacryloyloxyhexanoate)

Following the procedure of Example 6, 18.6 g (0.1 mol) of biphenyl-4,4'-diol (Merck, 64271 Darmstadt, Delaware) were reacted with 42.6 g (0.2 mol) of 6-bromohexanoyl chloride in toluene using triethylamine as acid scavenger. This gave 42 g (77.8%) of 4,4'-biphenyl bis(6-bromohexanoate) of m.p. 96° C. 35 g (0.065 mol) of this compound and 25 g (0.2 mol) of potassium methacrylate were suspended in 30 ml of dimethylformamide, 0.04 g of BHT was added, and the mixture was heated at 95° C. with stirring for 6.5 h. It was then cooled and taken up in water and methyl tert-butyl ether, and the two phases which formed were separated. Washing, drying and concentration of the organic phase gave a crude product which following recrystallization from methanol has a melting range of 50–59° C. and on cooling to 56° C. shows a supercoolable smectic phase.

The same method was also used, with 11-bromoundecanoic acid, to prepare 4,4'-biphenyl bis(11-methacryloyloxyundecanoate).

What is claimed is:

1. An organosiloxane which comprises at least one group of the general formula 1

and optionally, a group of the general formula 2

where

X is a cholesteryl, dihydrocholesteryl, doristeryl, isosorbidyl, isomannidyl or cholic acid radical or an unsubstituted or substituted radical selected from 1,4-phenyl, 4,4'-biphenylyl, 1,4-cyclohexylene, 4,4'-bicyclohexylene, 4,4'-cyclohexylenephenylene, or 2,5-substituted 1,3-dioxanyl and pyrimidinyl radicals where the substituent is a C$_1$- to C$_5$-alkoxy radical, C$_1$- to C$_5$-alkyl radical, cyano radical, chloro radical, or nitro radical, Q is a —COO— group or a —OOC— group or a —O— group or a chemical bond or a —O—(C=O)—O— group, Z is a chemical bond or a group —CH$_2$— or —CH$_2$—CH$_2$—, A is a 1,4-phenylene, 1,5-naphthylene, 2,6-naphthylene, 2,7-naphthylene, 4,4'-biphenylene, 1,4-cyclohexylene, 4,4'-bicyclohexylene, 4,4'-cyclohexylenephenylene, 2,5-(1,3-dioxanylene) or a pyrimidinylene radical, M is a chemical bond, an oxygen atom, or a group —COO—, —OCO— or —OOC—(CH$_2$)$_v$—COOCH$_2$CH$_2$—, VN is a group —COO—CH=CH$_2$, —COO—C(CH$_3$)=CH$_2$, —(CH$_2$)$_u$—O—CH=CH$_2$, —CH=CH$_2$, or an oxiranyl group, E is a group (CH$_2$)$_r$, where individual CH$_2$ groups can be replaced by oxygen, m and p are each integers from 3 to 6, r is 0 or an integer from 1 to 10, n, q and s are each 0 or 1, t is 0 or an integer from 1 to 3, u and v are each an integer from 2 to 8, and a is 0 or an integer from 1 to 6, with the proviso that in the groups of the general formulae 1 and 2 no oxygen atoms are attached directly to one another wherein at least one of E or —(CH$_2$CH$_2$O—)—is present.

2. An organosiloxane as claimed in claim 1 which is liquid-crystalline.

3. An organosiloxane as claimed in claim 1 which is composed of units of the general formula 3

  (3)

in which

R are C$_1$- to C$_4$-alkyl radicals,

Mes is a group of the general formula 1 or 2, b is 0, 1 or 2, and c is 0 or 1.

4. An organosiloxane as claimed in claim 2 which is composed of units of the general formula 3

  (3)

in which

R are C$_1$- to C$_4$-alkyl radicals,

Mes is a group of the general formula 1 or 2, b is 0, 1 or 2, and c is 0 or 1.

5. A process for preparing an organosiloxane as claimed in claim 1, in which organosiloxanes composed of units of the general formula 6

  (6)

in which R are C$_1$–C$_4$ alkyl radicals, b is 0, 1, or 2, and c is 0 or 1 are reacted with a mixture of compounds of the general formulae 4 and, optionally, 7

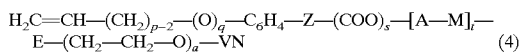  (4)

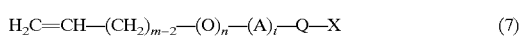  (7)

in which

Z, A, E, M, VN, Q, m, n, p, q, s, t and a are as defined for the general formulae 1 and 2, with the proviso that in the compounds of the general formulae 4 and 7 no oxygen atoms are attached directly to one another.

6. A process for preparing a liquid-crystalline organosiloxane as claimed in claim 2, in which organosiloxanes composed of units of the general formula 6

  (6)

in which R are C$_1$–C$_4$ alkyl radicals, b is 0, 1, or 2, and c is 0 or 1 are reacted with a mixture of compounds of the general formulae 4 and, optionally, 7

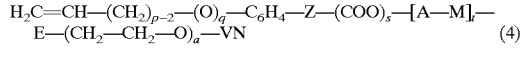  (4)

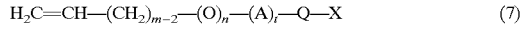  (7)

in which

Z, A, E, M, VN, Q, m, n, p, q, s, t and a are as defined for the general formulae 1 and 2, with the proviso that in the compounds of the general formulae 4 and 7 no oxygen atoms are attached directly to one another.

7. A process for preparing a liquid-crystalline organosiloxane as claimed in claim 3, in which organosiloxanes composed of units of the general formula 6

  (6)

in which R are C$_1$–C$_4$ alkyl radicals, b is 0, 1, or 2, and c is 0 or 1 are reacted with a mixture of compounds of the general formulae 4 and, optionally, 7

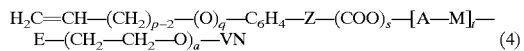  (4)

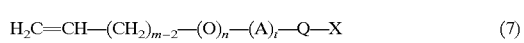  (7)

in which

Z, A, E, M, VN, Q, m, n, p, q, s, t and a are as defined for the general formulae 1 and 2, with the proviso that in the compounds of the general formulae 4 and 7 no oxygen atoms are attached directly to one another.

8. A process for preparing a liquid-crystalline organosiloxane as claimed in claim 4, in which organosiloxanes composed of units of the general formula 6

  (6)

in which R are C$_1$–C$_4$ alkyl radicals, b is 0, 1, or 2, and c is 0 or 1 are reacted with a mixture of compounds of the general formulae 4 and, optionally, 7

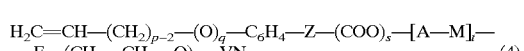  (4)

  (7)

in which

Z, A, E, M, VN, Q, m, n, p, q, s, t and a are as defined for the general formulae 1 and 2, with the proviso that in the compounds of the general formulae 4 and 7 no oxygen atoms are attached directly to one another.

9. A process for crosslinking an organosiloxane as claimed in claim 1, in which the organosiloxane is three-dimensionally crosslinked by means of free radicals.

10. A process for crosslinking an organosiloxane as claimed in claim 3, in which the organosiloxane is three-dimensionally crosslinked by means of free radicals.

11. A process for crosslinking an organosiloxane as claimed in claim 4, in which the organosiloxane is three-dimensionally crosslinked by means of free radicals.

12. A process for crosslinking an organosiloxane as claimed in claim 5, in which the organosiloxane is three-dimensionally crosslinked by means of free radicals.

13. The process as claimed in claim 5, in which said organosiloxane is crosslinked in a mixture with crosslinkers of the general formula 5

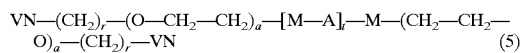

$$VN-(CH_2)_r-(O-CH_2-CH_2)_a-[M-A]_t-M-(CH_2-CH_2-O)_a-(CH_2)_r-VN \qquad (5)$$

in which

VN, a, r, A, t and M are as defined for the general formulae 1 and 2, optionally in admixture with compounds of the general formula 4 and/or nonmesogenic bisacrylates and/or bismethacrylates.

14. A crosslinked liquid-crystalline organosiloxane obtained by the process as claimed in claim 9.

15. A crosslinked liquid-crystalline organosiloxane obtained by the process as claimed in claim 13.

16. A pigment comprising the crosslinked liquid-crystalline organosiloxane of claim 14.

17. A film comprising a crosslinked liquid-crystalline organosiloxane as claimed in claim 1.

18. A film comprising a crosslinked liquid-crystalline organosiloxane as claimed in claim 2.

19. A film comprising a crosslinked liquid-crystalline organosiloxane as claimed in claim 3.

20. The crosslinked liquid-crystalline organosiloxane of claim 14, which has a glass transition temperature of not more than 80° C.

21. The crosslinked liquid-crystalline organosiloxane of claim 15, which has a glass transition temperature of not more than 80° C.

22. A crosslinked liquid crystalline organosiloxane having a glass transition temperature of not more than 80° C., comprising a crosslinked reaction product of at least one organosiloxane of claim 1.

* * * * *